(12) United States Patent
Garbacz

(10) Patent No.: US 9,387,654 B2
(45) Date of Patent: Jul. 12, 2016

(54) METHOD OF CONNECTING ELEMENTS MADE OF FOAMED ETHYLENE COPOLYMER AND VINYL ACETATE EVA WITH POLYURETHANE

(71) Applicant: ZakLad Produkcji Obuwia "LEMIGO", Grudziadz (PL)

(72) Inventor: Miroslaw Garbacz, Grudziadz (PL)

(73) Assignee: ZAKLAD PRODUKCJI OBUWIA "LEMIGO", Grudziadz (PL)

( * ) Notice: Subject to any disclaimer, the term of this patent is extended or adjusted under 35 U.S.C. 154(b) by 182 days.

(21) Appl. No.: 14/191,781

(22) Filed: Feb. 27, 2014

(65) Prior Publication Data

US 2015/0174877 A1 Jun. 25, 2015

(30) Foreign Application Priority Data

Dec. 20, 2013 (PL) .................................... 406614

(51) Int. Cl.

| | |
|---|---|
| *B32B 37/12* | (2006.01) |
| *C08J 5/12* | (2006.01) |
| *B32B 5/18* | (2006.01) |
| *B32B 7/12* | (2006.01) |
| *B29D 35/00* | (2010.01) |
| *B29D 35/12* | (2010.01) |
| *B29C 39/00* | (2006.01) |
| *B29C 39/12* | (2006.01) |
| *B32B 27/40* | (2006.01) |
| *C09D 175/04* | (2006.01) |
| *C09J 5/02* | (2006.01) |
| *B32B 27/06* | (2006.01) |
| *A43B 13/04* | (2006.01) |
| *C08G 18/48* | (2006.01) |
| *B29C 37/00* | (2006.01) |
| *B29C 35/08* | (2006.01) |
| *B32B 38/16* | (2006.01) |
| *B32B 38/00* | (2006.01) |

(52) U.S. Cl.
CPC ................ *B32B 37/12* (2013.01); *A43B 13/04* (2013.01); *B29C 39/003* (2013.01); *B29C 39/12* (2013.01); *B29D 35/00* (2013.01); *B29D 35/12* (2013.01); *B32B 5/18* (2013.01); *B32B 7/12* (2013.01); *B32B 27/065* (2013.01); *B32B 27/40* (2013.01); *C08G 18/48* (2013.01); *C08J 5/12* (2013.01); *C09D 175/04* (2013.01); *C09J 5/02* (2013.01); *B29C 37/0028* (2013.01); *B29C 2035/0827* (2013.01); *B32B 38/162* (2013.01); *B32B 2038/0016* (2013.01); *B32B 2038/168* (2013.01); *B32B 2250/02* (2013.01); *B32B 2266/0221* (2013.01); *B32B 2307/304* (2013.01); *B32B 2307/7265* (2013.01); *B32B 2331/04* (2013.01); *B32B 2375/00* (2013.01); *B32B 2437/02* (2013.01)

(58) Field of Classification Search
CPC .................................... C08J 5/12; B32B 37/12
See application file for complete search history.

(56) References Cited

PUBLICATIONS

English Abstract of Polish Patent PL 398812, date unknown.*

* cited by examiner

*Primary Examiner* — Jeff Aftergut
(74) *Attorney, Agent, or Firm* — Katten Muchin Rosenman LLP

(57) ABSTRACT

The patentable subject matter is the method for joining foamed copolymer of ethylene and vinyl acetate (EVA) with polyurethane (PU) by combining hot PU mixture with a solid substrate made of foamed EVA. The method as per the invention is intended to be used largely in footwear manufacture processes. The joining method wherein the surfaces of an element being joined made of foamed EVA (polyethylene-co-vinyl acetate) are prepared by mechanical grinding of the surface and subsequent degreasing, characterized in that the surfaces of the element made of foamed EVA (polyethylene-co-vinyl acetate) are heated to and kept at the temperature of 45-55° C. and then 2-butanol activator is applied which is then cured with UV rays for 15 seconds and subsequently POLYOL GF 422 and IZO GT 991 are heated for 10-12 hours with POLYOL being heated to 70-80° C. combining with the catalyst and IZO being heated to 65-75° C., after which the components are mixed and applied on the surface of the EVA element and next the polyurethane adhesive is applied on the surface being joined and the element prepared in this way is placed in the mold and cast with the mixture of POLY+CROS with the temperature of 51° C. and ISO with the temperature of 43° C. and then formed for 240 seconds.

6 Claims, No Drawings

METHOD OF CONNECTING ELEMENTS MADE OF FOAMED ETHYLENE COPOLYMER AND VINYL ACETATE EVA WITH POLYURETHANE

The patentable subject matter is the method for joining foamed copolymer of ethylene and vinyl acetate (EVA) with polyurethane (PU) by joining together hot PU mixture with a solid substrate made of foamed EVA. The method as per the invention is intended to be used principally in footwear production processes.

So far, the joining of foamed EVA with PU was performed by physical gluing of solid elements made of foamed copolymer of ethylene and vinyl acetate (EVA) to polyurethane elements on the assembly line.

Adhesive compound, mainly for joining foamed plastics, is already known from the patent description PL 209691. Such compounds are used for joining together heat-insulating plastics (in particular foamed polystyrene or polyurethane) and heat-insulating plastics with various substrates as well as for lamination of foamed plastics. The compound consists of polystyrenes, polyhydric alcohols and isocyanates. It contains fillers such as silica gels and/or organic gels and/or fibres and is characterised in that it contains solvent-free polymers in the form of polyisobutylene, polymeric dispersion, carbamide and catalysts.

The method of making of a structural heat-insulating element is already known from the patent description PL 210698. This method consists of making of a separating heat-insulating and heat-resistant layer by mixing of polymer derivatives with other materials. The layer is joined to a hard substrate with the layer's external surface (i.e. surface facing the source of heat). The separating heat-insulating and heat-resistant layer is made by mixing ground elastic polyurethane foam with graphitic-carbonic-ceramic correctors, carbamide, prepolymer and water in the stoichiometric amount. Subsequently, the mixture is pressed resulting in the mixture components being joined together. The separating layer prepared in this way is joined with the external layer made subsequently as a result of which a cohesive composite structure is formed, including a protective jacket created under the influence of adhesive forces occurring during the making of that external layer, preferably from hard porous polyurethane modified with inorganic colloids, stabilizers and correctors.

The method of wall insulation using polyurethane panels is already known from the patent description PL 207408 which consists of placement of a thin layer of self-foaming organic glue, preferably with polyurethane, potentially with addition of a catalyst to accelerate curing, on the panel surface. After waiting preferably 5-10 minutes for the adhesive to thicken, the panel is pressed against the wall, then ground with abrasive paper to obtain coarse texture and coated with a thin layer of known primer and subsequently plastered with mineral or synthetic plaster.

The method of joining foamed EVA with PU by injection of hot finished polymerised PU on to a solid substrate made of foamed EVA is known from the patent EP0802041. Such joint, however, was impermanent and had low adhesion properties which disqualified a product exposed to stress between both layers which could lead to full separation of the layers.

Also, the method of joining elements made of foamed copolymer of ethylene and vinyl acetate (EVA) with polyurethane (PU) is known from the patent application PL 398812, especially as part of the footwear manufacture process wherein the surface of an element made of foamed EVA is prepared by degreasing the surface with an organic solvent and subsequently, during the second stage, mechanical roughening of the surface, potentially with addition of an organic solvent or by application of primer of which surface is hardened by UV radiation until the surface is dried. Subsequently, polyurethane or polychloroprene adhesive or other adhesive related to polyurethane is applied on the surface prepared in this way and, after the surface has dried, the mixture of polyol and isocyanate is poured or injected at a temperature of 40-60° C. on to such surface, while initiating at the same time the reaction of polyurethane polymerisation and chemical bonding between EVA being foamed and the polyurethane. In the method as per the patentable invention, the mixture of polyol and isocyanate is preferably poured or injected directly into the mould where an element such as a footwear item or other moulded piece is made from foamed EVA. In the method as per the invention, the mixture of polyol and isocyanate, with or without foaming additives, is preferably used so as to create a layer of foamed or solid polyurethane combined with foamed EVA; solvent from the acetone or heptane group and the mixture of acetone and other polar solvents is used as a polar organic solvent. The curing time of prime coat when cured with UV rays is selected depending on the primer type and the power of UV lamps, which is preferably from 0.9 to 1.5 $J/cm^2$ of the surface being cured.

The known solutions of joining foamed copolymer of ethylene and vinyl acetate (EVA) with polyurethane (PU) do not ensure stable connection and have low adhesiveness which disqualifies a product that is exposed to stresses between both layers which ultimately results in full separation of the layers.

As yet, the method as per the invention has not been used or described in literature.

The solution as per the invention allows for permanent joining of elements of a footwear item made of EVA with elements made of polyurethane in footwear manufacturing processes. The method as per the invention consists in stable and quick joining of footwear elements with the application of the technique of joining EVA with polyurethane using appropriate semi-finished products (half-products) and specific sequence and parameterization of respective operations.

The procedure is as follows:

First, surfaces of an element made of foamed EVA are prepared by mechanical grinding performed to roughen the surface of the material; subsequently, the surfaces are degreased with a polar solvent and then the surfaces are dried and soaked at a temperature of 45-55° C. in order to evaporate the solvent; then an activating agent is applied (mixture of benzene, methylene, 2-butanol, 2-propanol and ethyl acetate) which is cured using UV rays. Another stage consists of preparing the polyol and isocyanate plastic material and the machine—pouring machine—with the shape of moulds reflecting exactly the shape of the sole of the footwear being manufactured. POLYOL GF 422 is heated to the temperature of 70-80° C. for 18-24 hours, IZO GT 991 is heated to the temperature of 65-75° C. for 10-12 hours and then POLYOL GF 422 is combined with GM 819 CROS. MOD. catalyst, preferably in the ratio of 15:1, by being mixed at a slow speed for 20-40 minutes. Moulds on the machine are heated to the temperature of 45-50° C. and polyurethane adhesive (mixture of EVX 169 adhesive and RFE activation agent) is applied on the glued surface in the ratio of 1:40 one to four hours before pouring of the glued element (adhesive is diluted with solvent preferably in the proportion of 3:1).

After the machine and semi-finished products are prepared, the pouring of EVA profiles with the ISO/POLY mixture can be commenced. An EVA footwear item is placed in the stamping section of the mould and then the POLY+CROS mixture with the temperature of 51° C. and ISO with the temperature of 43° C. is poured into the mould die, preferably in the proportion of 2:1, and combined. The mixture being poured is homogenized by being mixed in a special mixing chamber which is part of the machine—pouring machine.

After pouring, the mould is closed as a result of which the footwear item is submerged in the liquid PU mixture. The mould is opened on expiry of 240 seconds; finished products are removed, cooled and put away for 12 hours. After that time, the joined footwear elements are ready for further processing (finishing).

EXAMPLE

The surfaces of an foamed EVA (polyethylene-co-vinyl acetate) element were prepared by mechanical grinding of the surface, i.e. roughening of the material and subsequent degreasing of the surface with a polar solvent Solvente ST 198 containing heptane, and the degreased surface was dried and heated to the temperature of 48° C. Subsequently, an EVX/3513 Primer activating agent was applied on the surface and cured with UV rays for 15 seconds. Next, plastic was prepared, which consisted of the mixture of polyol and isocyanate with POLYOL GF 422 being heated to the temperature of 60° C. and kept heated for 20 hours and IZO GT 991 heated to 68° C. and kept so heated for 9 hours, and with polyol being combined with GM 819 CROS. MOD. catalyst in the proportion of 190:11.51 by weight, by mixing for 30 minutes; subsequently, 3 hours prior to the pouring of the element being joined, EVX 169 polyurethane adhesive with RFE activator was applied on the glued surface in the proportion of 1:40 with the adhesive being diluted with ST-121 solvent in the ratio of 3:1 and the moulds being heated to 48° C. After that, an EVA element was placed in the stamping section of the mould and the POLY+CROS mixture with the temperature of 51° C. and ISO of 43° C. were poured into the die in the proportion of 100:58 by weight. After pouring, the mould was closed for 240 seconds. On expiry of 6-12 seconds, polymerisation of plastic and the bonding of the polyurethane mixture with EVA plastic took place.

Description of Components:

EVA—expandable copolymer of ethylene and vinyl acetate (polyethylene-co-vinyl acetate), material made up of polyethylene (ca. 82%) and vinyl acetate (18%). When adding appropriate foaming agents and dyes, it forms light plastic ideal for manufacture of waterproof technical elements and insulating films.

Polar solvent—chemical compound with small viscosity and a relatively low boiling point; low viscosity makes the compound easily penetrate a substance being thinned and the low boiling temperature allows evaporation.

Activator—mixture of benzene, methylene, 2-butanol, 2-propanol and ethyl acetate—adhesiveness activator for prepared material in the footwear manufacture industry; it is a ground coat applied to a footwear item to improve adhesive properties.

POLYOL GF 422—polyurethane production component (polyol), mixture of polyol, stabilizers and fire protection agent IZO GT 991—polyurethane production component (iso), mixture of additives and 4,4'-methylene diphenyl diisocyanate/4,4'-diphenylmethane diisocyanate GM 819 CROS. MOD.—mixture of catalyst, additives, ethane-1,2-diol/ethylene glycol EVX 169 adhesive—two-component polyurethane adhesive RFE activator—adhesive hardener

The invention claimed is:

1. A method of joining elements made of foamed copolymer of ethylene and vinyl acetate with polyurethane
wherein surfaces of an element being joined made of foamed copolymer of ethylene and vinyl acetate are prepared by mechanical grinding of the surfaces and by degreasing, characterised in that the surfaces of the element made of foamed copolymer of ethylene and vinyl acetate are kept at the temperature of 45-55° C. and then 2-butanol activator is applied which is cured with ultraviolet rays and
subsequently a mixture of polyol, stabilizers and fire protection agent and a mixture of additives and 4,4'-methylene diphenyl diisocyanate/4,4'-diphenylmethane diisocyanate plastic is heated for 10-12 hours with the mixture of polyol, stabilizers and fire protection agent being heated to 70-80° C. and combined with a catalyst and the mixture of additives and 4,4'-methylene diphenyl diisocyanate/4,4'-diphenylmethane diisocyanate plastic being heated to 65-75° C.;
the mixture of polyol, stabilizers and fire protection agent, the catalyst, and the mixture of additives and 4,4'-methylene diphenyl diisocyanate/4,4'-diphenylmethane diisocyanate plastic are then mixed and applied on the surface of the copolymer of ethylene and vinyl acetate element;
next, polyurethane adhesive is applied on the surfaces being joined and the element prepared in this way is placed in a mould and poured with the mixture of polyol, stabilizers and fire protection agent a mixture of catalyst, additives, ethane-1,2-diol/ethylene glycol with the temperature of 51° C. and the mixture of additives and 4,4'-methylene diphenyl diisocyanate/4,4'-diphenylmethane diisocyanate plastic with the temperature of 43° C. and formed for 240 seconds.

2. The elements joining method as per claim 1 characterised in that the mixture of polyol, stabilizers and fire protection agent is combined with the mixture of catalyst, additives, ethane-1,2-diol/ethylene glycol catalyst in a proportion of 15:1.

3. The elements joining method as per claim 1, characterised in that the polyurethane adhesive is a mixture of a two-component polyurethane adhesive and an adhesive hardener in a ratio of 1:40, diluted with a solvent in a proportion of 3:1.

4. The elements joining method as per claim 1, characterised in that the polyurethane adhesive is applied on the surfaces being joined 1-4 hours before pouring of the mould.

5. The elements joining method as per claim 1, characterised in that the moulds, before the mould is poured, is heated to a temperature of 45-50° C.

6. The elements joining method as per claim 1 characterised in that a proportion of the mixture of polyol, stabilizers and fire protection agent+ the mixture of catalyst, additives, ethane-1,2-diol/ethylene glycol to the mixture of additives and 4,4'-methylene diphenyl diisocyanate/4,4'-diphenylmethane diisocyanate plastic is 2:1.

* * * * *